US009929845B2

(12) United States Patent
Pajukoski et al.

(10) Patent No.: US 9,929,845 B2
(45) Date of Patent: Mar. 27, 2018

(54) ENHANCED RANDOM ACCESS CHANNEL PROCEDURE (71) Applicant: Nokia Solutions and Networks Oy, Espoo (FI)

(72) Inventors: Kari Pekka Pajukoski, Oulu (FI); Esa Tapani Tiirola, Kempele (FI); Kari Juhani Hooli, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/503,966

(22) PCT Filed: Aug. 29, 2014

(86) PCT No.: PCT/EP2014/068342
§ 371 (c)(1),
(2) Date: Feb. 14, 2017

(87) PCT Pub. No.: WO2016/029958
PCT Pub. Date: Mar. 3, 2016

(65) Prior Publication Data
US 2017/0279584 A1 Sep. 28, 2017

(51) Int. Cl.
H04W 4/06 (2009.01)
H04L 5/00 (2006.01)
H04L 1/00 (2006.01)
H04W 72/12 (2009.01)
H04W 74/00 (2009.01)
H04W 74/08 (2009.01)

(52) U.S. Cl.
CPC .......... *H04L 5/0053* (2013.01); *H04L 1/0038* (2013.01); *H04L 5/0051* (2013.01);
(Continued)

(58) Field of Classification Search
CPC ............. H04W 72/044; H04W 72/085; H04W 72/0413; H04W 72/14; H04W 72/04;
(Continued)

(56) References Cited

U.S. PATENT DOCUMENTS

2012/0254890 A1* 10/2012 Li ........................ H04W 4/005
719/313
2013/0010711 A1* 1/2013 Larsson ............ H04W 56/0005
370/329

FOREIGN PATENT DOCUMENTS

EP         2672648 A1    12/2013
WO    2012/131654 A1    10/2012
WO    2013/006111 A1     1/2013

OTHER PUBLICATIONS

"New Proposed SI: Study on Latency Reduction Techniques for LTE", 3GPP TSG RAN Meeting #64, RP-140622, Agenda: 14.1.2, Ericsson, Jun. 10-13, 2014, 6 Pages.
(Continued)

*Primary Examiner* — Phuoc H Doan
(74) *Attorney, Agent, or Firm* — Squire Patton Boggs (US) LLP (57) ABSTRACT

Systems, methods, apparatuses, and computer program products for an enhanced random access channel (RACH) procedure are provided. One method may include receiving an access request comprising a signature from at least one user equipment. The method may then include providing, to the at least one user equipment, multiple at least partially overlapping resource opportunities for a first scheduled transmission, and performing blind decoding of the first scheduled transmission for the multiple at least partially overlapping resource opportunities.

18 Claims, 4 Drawing Sheets

(52) U.S. Cl.
CPC ....... *H04L 5/0094* (2013.01); *H04W 72/1289* (2013.01); *H04W 74/004* (2013.01); *H04W 74/0833* (2013.01)

(58) Field of Classification Search
CPC ... H04L 5/0007; H04L 5/0055; H04L 1/0003; H04L 5/0048
USPC .................. 370/329, 330, 241, 338; 719/313
See application file for complete search history.

(56) References Cited

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300, V12.1.0, Mar. 2014, pp. 1-209.

Holma et al., "Preamble Sequence", LTE for UMTS: Evolution to LTE-Advanced, Second Edition, Chapter 5.7.2, Mar. 2011, 559 pages.

"3rd Generation Partnership Project; Technical Specification Group Radio Access Network; Evolved Universal Terrestrial Radio Access (E-UTRA); Physical layer procedures (Release 12)", 3GPP TS 36.213, V12.1.0, Mar. 2014, pp. 1-186.

International Search Report and Written Opinion received for corresponding Patent Cooperation Treaty Application No. PCT/EP2014/068342, dated May 28, 2015, 11 pages.

\* cited by examiner

ENHANCED RANDOM ACCESS CHANNEL PROCEDURE

RELATED APPLICATION

This application was originally filed as PCT Application No. PCT/EP2014/068342 filed Aug. 29, 2014.

FIELD

Embodiments of the invention generally relate to wireless communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A) and/or future 5G radio access technology. In particular, some embodiments may relate to capacity and latency of random access channel (RACH).

BACKGROUND

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the enhanced Node B (eNodeB or eNB).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-11, LTE Rel-12, LTE Rel-13, LTE Rel-14) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility. One the key features of LTE-A is carrier aggregation, which allows for increasing the data rates through aggregation of two or more LTE carriers.

SUMMARY

One embodiment is directed to a method that may include receiving, from at least one user equipment, an access request comprising a signature. The method may also include providing, to the at least one user equipment, multiple at least partially overlapping resource opportunities for a first scheduled transmission, and performing blind decoding for the at least partially overlapping resource opportunities.

Another embodiment is directed to an apparatus including at least one processor and at least one memory including computer program code. The at least one memory and computer program code are configured, with the at least one processor, to cause the apparatus at least to receive an access request comprising a signature from at least one user equipment, provide, to the at least one user equipment, multiple at least partially overlapping resource opportunities for a first scheduled transmission, and perform blind decoding for the at least partially overlapping resource opportunities.

Another embodiment is directed to an apparatus including means for receiving, from at least one user equipment, an access request comprising a signature. The apparatus may also include means for providing, to the at least one user equipment, multiple at least partially overlapping resource opportunities for a first scheduled transmission, and means for performing blind decoding for the at least partially overlapping resource opportunities.

Another embodiment is directed to a computer program, embodied on a computer readable medium. The computer program is configured to control a processor to perform a process including receiving, from at least one user equipment, an access request comprising a signature. The process may also include providing, to the at least one user equipment, multiple at least partially overlapping resource opportunities for a first scheduled transmission, and performing blind decoding for the at least partially overlapping resource opportunities.

Yet another embodiment is directed to a method that may include transmitting an access request comprising a signature, and receiving a response. The method may then include selecting one of multiple at least partially overlapping resource opportunities to transmit a first scheduled transmission. In one example embodiment, the multiple at least partially overlapping resource opportunities for the first scheduled transmission may be received from an evolved node B (eNodeB) in the response.

Another embodiment is directed to an apparatus including at least one processor and at least one memory including computer program code. The at least one memory and computer program code are configured, with the at least one processor, to cause the apparatus at least to transmit an access request comprising a signature, and to receive a response. The apparatus may then be caused to select one of multiple at least partially overlapping resource opportunities to transmit a first scheduled transmission. In one example embodiment, the multiple at least partially overlapping resource opportunities for the first scheduled transmission may be received from an evolved node B (eNodeB) in the response.

Another embodiment is directed to an apparatus including means for transmitting an access request comprising a signature, and means for receiving a response. The apparatus may also include means for selecting one of multiple at least partially overlapping resource opportunities to transmit a first scheduled transmission. In one example embodiment, the apparatus may include means for receiving multiple at least partially overlapping resource opportunities for the first scheduled transmission from an evolved node B (eNodeB) in the response.

Another embodiment is directed to a computer program, embodied on a computer readable medium. The computer program is configured to control a processor to perform a process including transmitting an access request comprising a signature, receiving a response, and selecting one of multiple at least partially overlapping resource opportunities to transmit a first scheduled transmission. In one example embodiment, the multiple at least partially overlapping resource opportunities for the first scheduled transmission may be received from an evolved node B (eNodeB) in the response.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of embodiments of systems, methods, apparatuses, and computer program products for an enhanced random access channel (RACH) procedure, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Embodiments of the invention relate to improved capacity of random access and/or latency reduction. Some embodiments are targeted to 5G, however other embodiments may also be applicable to other LTE releases, such as LTE Rel-13 or LTE Rel-14. One embodiment provides a random access procedure targeted to maximizing RACH capacity or minimizing the physical random access channel (PRACH) overhead. This can be seen as a way to improve the latency for Idle-mode UEs.

Thus, embodiments of the invention provide a solution to improve resistivity against collisions when multiple UEs select the same signature. In an embodiment, this may be achieved by employing advanced receiver in eNodeB (eNB) when detecting the first scheduled message, such as message 3 in LTE. For example, according to one embodiment, the eNB may provide multiple at least partially overlapping resource opportunities for random access message 3, and the UE may then select one of those resource opportunities (e.g., according to predetermined rules) for transmission of the first scheduled uplink message or transmission. In an embodiment, the first scheduled message may be LTE message 3. Resources can be separated by different reference signals, different time advance value, or different sub-carrier allocation.

Figure 1:
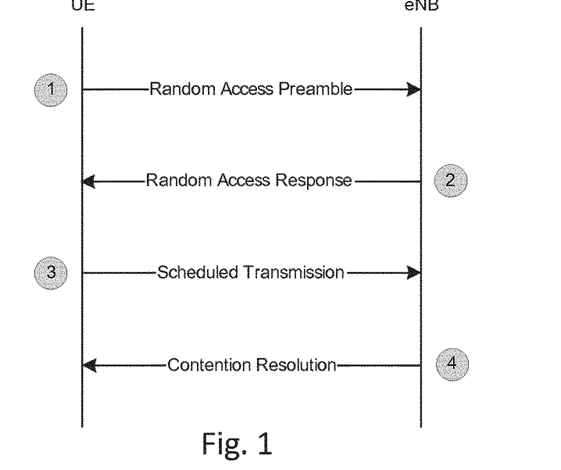
FIG. 1 illustrates a call flow diagram depicting the steps of a LTE contention based procedure.

The LTE contention based random access procedure is described, for example, in 3GPP TS 36.300 chapter 10.1.15.1. FIG. 1 illustrates a call flow diagram depicting the steps of a LTE contention based procedure. As illustrated in FIG. 1, at 1, the UE transmits a random access preamble to the eNB. Then, at 2, the UE receives a random access response from the eNB. At 3, the UE schedules transmission and receives contention resolution from the eNB at 4.

Figure 2:
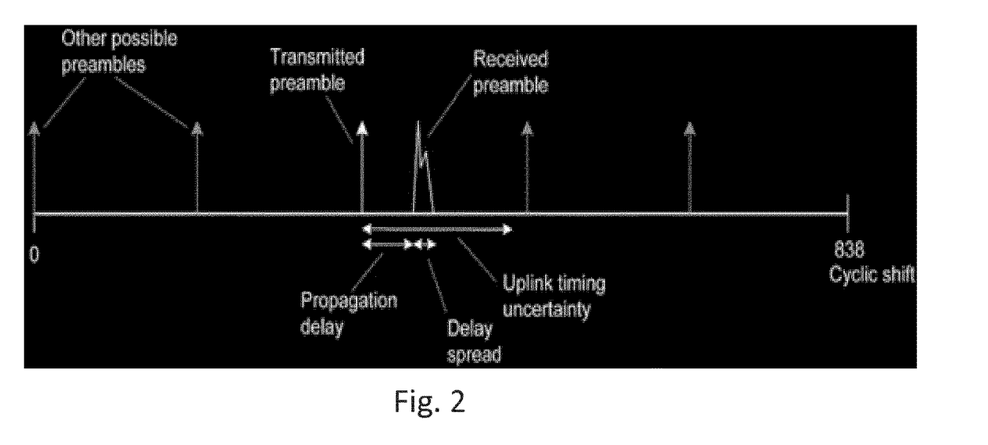
FIG. 2 illustrates an example of cyclic shift separation of LTE.

FIG. 2 illustrates an example of cyclic shift separation of LTE. In LTE, cyclic shifts of a predefined CAZAC sequence are used to create parallel RACH signatures. The cyclic shift separation is illustrated, for example, in: "LTE for UMTS", Chapter 5.7.2, Holma & Toskala. The cyclic shift separation should accommodate the uplink timing uncertainty (as the timing advance is not yet applied when transmitting contention based PRACH).

When a UE transmits a RACH Preamble, it selects one of 64 RACH signatures. It's possible that multiple UEs will send identical signatures resulting that the same PRACH preamble from multiple UE reaches the eNB at the same time. In this case, multiple UE's will transmit the first scheduled message by using the same physical resource, which results in failed detection of random access (RA) message 3. For that reason, the eNB and UE go through additional process(es) to resolve this collision. This is referred to as the "contention resolution" step, as depicted in step 4 of FIG. 1, and the goal is to determine whether or not multiple UEs used the same combination of RA-radio network temporary identifier (RNTI) and preamble sequence.

The delay component of physical layer in FDD mode for idle to connected transition is shown in Table 1. It is assumed that RACH is scheduled once per every subframe (1 ms). In TDD mode, the latency is up to 1.5 times higher than in FDD mode. It depends on UUDL frame configuration and the location of RACH trigger in the TDD frame. The delay of Contention Resolution can be much higher in some cases because when the contention resolution step fails, the UE needs to restart from the first step.

TABLE 1

| 1 | RACH Waiting Time + Preamble | 0.5 | 1 |
|---|---|---|---|
| 2 | eNB Processing times + Random Access Response | 3 | 1 |
| 3 | UE processing time + Scheduled Message | 3 | 1 |
| 4 | Contention Resolution step * | 6 | 2 |

In view of the issues discussed above, PRACH Capacity in the terms of maximum number of devices supported is limited due to collisions between RACH signatures. In addition, the high number of signatures needed for high capacity results in high overhead, and the latency increases due to collision between RACH signatures.

Certain embodiments provide a solution to improve resistivity against collisions when multiple UEs select the same signature. This may be achieved by employing an advanced receiver in the eNB when detecting the first scheduled message. The procedure according to one embodiment may follow the random access procedure used in LTE. Some embodiments may apply to the first scheduled uplink transmission, called random access message 3 (step 3 in FIG. 1 discussed above).

According to one embodiment, the eNB may provide multiple at least partially overlapping resource opportunities for random access message 3, and the UE may then select one of those resource opportunities (e.g., according to pre-determined rules) for transmission of message 3. In one embodiment, 'partially overlapping' means that the data resource is the same but the reference signal resource may be different. Embodiments provide different approaches for how to provide those multiple resources, as discussed in detail below. The UE may select one of those resources, for example in random or pseudo-random manner. Furthermore, additional rules can be applied in the selection process. For example, different resources may have different priorities or probabilities. Furthermore, resource selection can be combined with one or more UE measurements, e.g., with respect to predefined DL reference signal(s).

One embodiment provides separation in DMRS domain. In this embodiment, m (m>1) demodulation reference signal sequences (DMRS) are reserved for the first scheduled transmission (e.g., random access message 3). The UE may randomly select one out of the m DMRS sequences available. In an embodiment, the m DMRS sequences are comprised of m cyclic shifts of the same base sequence. The eNB may perform blind decoding for m DMRS sequences. The eNB may perform channel estimate for each of m DMRS sequence and employ interference rejection combining (IRC) between antennas. The eNB may also employ successive interference cancellation (SIC) to improve performance. Orthogonal cover code (OCC) is another way to provide orthogonal DM RS sequences. OCC method can be used either alone or it can be combined with cyclic shift method.

Another embodiment provides separation in delay domain. In this embodiment, the UE selects time offset for the first scheduled transmission based on timing estimated from DL signal and/or range of timing offset signalled by the eNB. The time offset can be made cyclically in the symbol level inside the single carrier frequency division multiple access (SC-FDMA) symbol (block of symbols) or it can be set on sample level prior discrete Fourier transform (DFT). The same or different cyclical offset can be set for DMRS symbol and data symbols. The eNB may employ time offset between UE's to the detection process. At the beginning, the eNB may estimate the time offsets of candidates following channel weights estimation for each candidate and then perform blind detection of candidates. IRC and SIC receiver may also be employed in this embodiment as discussed above.

Yet another embodiment provides separation in frequency domain. In this embodiment, n (n>1) at least partially overlapped time or frequency domain resources are reserved or signaled in random access response (RAR) for the first scheduled transmission. The UE may select time/frequency resource for the first scheduled transmission based on resources signalled by the eNB. The eNB may employ IRC and SIC receiver to cancel interference between overlapping resources.

It should be noted that the embodiments discussed above may be combined or performed in any order.

It is also noted that, according to embodiments of the present invention, the contention resolution step (step 4 in FIG. 1) may work as a fall back scheme. In other words, the "contention resolution" phase is always available for the cases when the eNB does not solve the collision in the case where multiple UEs used the same combination of RA-RNTI and preamble sequence. This means that delay performance of the present invention is never worse than with current LTE solution.

According to an embodiment, one implementation may provide the needed signalling support in a Random Access Response (RAR). For example, in the case of separation in DMRS domain, there can be multiple cyclic shift values included in the UL grant (which is part of the payload of RAR) triggering RA msg3. Those cyclic shift values can be signalled explicitly or they can be derived from the signalled value(s).

In an embodiment, current RAR signalling may be used as such (i.e., according to current LTE releases). Legacy UEs can use the existing procedure for transmitting RA msg3. New UEs supporting the new RACH feature may derive the selected resource based on predetermined rule(s). In an embodiment, new UEs supporting the new RACH feature do not use the resource made available for legacy UEs (even though they would be using the same RAR message). This means that legacy UEs can also benefit from the features of the present invention. According to certain embodiments, the new RACH feature can be made to be cell specific. In addition, it can be switched on/off using broadcasted system information or other suitable higher layer signalling.

Therefore, in an embodiment, the UE may be configured to receive a RAR and related UL grant, derive the available resources for RA msg3, select one of the available resources, and transmit RA msg3 according to scheduling grant given in the RAR. In one embodiment, the UE may perform random selection among available resources before transmitting the RA Msg3.

Figure 3A:
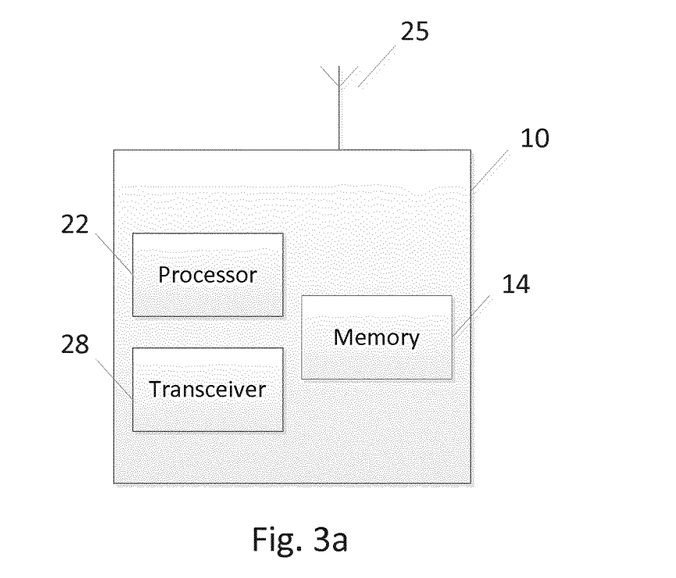
FIG. 3a illustrates a block diagram of an apparatus, according to one embodiment.

FIG. 3a illustrates an example of an apparatus 10 according to an embodiment. In an embodiment, apparatus 10 may be a node, host, or server in a communications network or serving such a network. In an embodiment, apparatus 10 may be a base station in a communications network, such as an eNB in LTE. It should be noted that one of ordinary skill in the art would understand that apparatus 10 may include components or features not shown in FIG. 3a.

As illustrated in FIG. 3a, apparatus 10 includes a processor 22 for processing information and executing instructions or operations. Processor 22 may be any type of general or specific purpose processor. While a single processor 22 is shown in FIG. 3a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

As discussed above, in one embodiment, apparatus 10 may be a base station or eNB. In this embodiment, apparatus 10 may be controlled by memory 14 and processor 22 to receive an access request, which may comprise a signature, from at least one user equipment, and to provide, to at least one user equipment, multiple at least partially overlapping resource opportunities for a first scheduled transmission. In an embodiment, apparatus 10 may be controlled by memory 14 and processor 22 to perform blind decoding for the at least partially overlapping resource opportunities. According to an embodiment, the first scheduled transmission may be random access message 3. In an embodiment, apparatus 10 may be controlled by memory 14 and processor 22 to provide the multiple at least partially overlapping resource opportunities in a random access response. In an embodiment, the first scheduled transmission is received with different assumptions for used partially overlapping resource opportunities. For example, if there are four different cyclic shifts available, apparatus 10 would receive message 3 using four different CSs. According to one embodiment, the multiple at least partially overlapping resource opportunities occupy the same resource space defined in frequency and time.

According to certain embodiments, apparatus 10 may be controlled by memory 14 and processor 22 to reserve at least one demodulation reference signal sequences (DMRS) for the first scheduled transmission. In an embodiment, apparatus 10 may be controlled to perform blind decoding for the at least one demodulation reference signal sequences (DMRS). According to one embodiment, apparatus 10 may be controlled by memory 14 and processor 22 to calculate a channel estimate for each of the at least one demodulation reference signal sequences (DMRS) and employ interference rejection combining (IRC) between antennas. In some embodiments, apparatus 10 may be controlled to apply serial interference cancellation (SIC).

In other embodiments, apparatus 10 may be controlled by memory 14 and processor 22 to estimate time offset between user equipment and signal the estimated time offset to the at least one user equipment. According to one embodiment, apparatus 10 may be controlled by memory 14 and processor 22 to reserve at least one partially overlapped time or frequency domain resources for the first scheduled transmission.

Figure 3B:
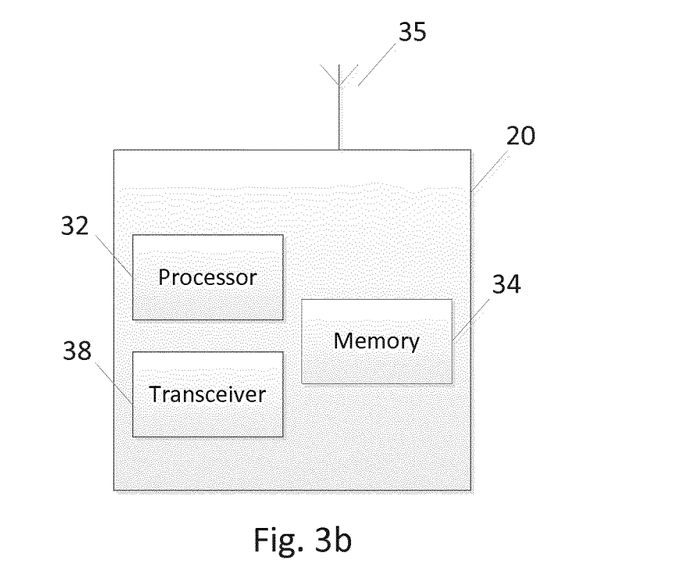
FIG. 3b illustrates a block diagram of an apparatus, according to another embodiment.

FIG. 3b illustrates an example of an apparatus 20 according to another embodiment. In certain embodiments, apparatus 10 may be a node, host, or server in a communications network or serving such a network. Specifically, in an embodiment, apparatus 20 may be a mobile device or UE. It should be noted that one of ordinary skill in the art would understand that apparatus 20 may include components or features not shown in FIG. 3b.

As illustrated in FIG. 3b, apparatus 20 includes a processor 32 for processing information and executing instructions or operations. Processor 32 may be any type of general or specific purpose processor. While a single processor 32 is shown in FIG. 3b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 further includes a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile station or UE. In this embodiment, apparatus 20 may be controlled by memory 34 and processor 32 to receive multiple at least partially overlapping resource opportunities for a first scheduled transmission, and to select one of the multiple at least partially overlapping resource opportunities to transmit the first scheduled transmission. In one embodiment, the first scheduled transmission may be a random access message 3. In certain embodiments, apparatus 20 may be controlled by memory 34 and processor 32 to receive the multiple at least partially overlapping resource opportunities in a random access response.

According to one embodiment, at least one demodulation reference signal sequences (DMRS) are reserved for the first scheduled transmission. In this case, apparatus 20 may be controlled by memory 34 and processor 32 to select one out of the at least one demodulation reference signal sequences (DMRS) for the first scheduled transmission. In an embodiment, the at least one demodulation reference signal sequences (DMRS) may comprise at least one cyclic shift of a same base sequence.

According to another embodiment, apparatus 20 may be controlled by memory 34 and processor 32 to receive estimated time offset from an eNodeB, and to select a time offset for the first scheduled transmission based on the estimated time offset received from the eNodeB. In an embodiment, the time offset may be made cyclically in symbol level inside single carrier frequency division multiple access (SC-FDMA) symbol or is set on sample level prior discrete Fourier transform (DFT).

In another embodiment, at least one partially overlapped time or frequency domain resources may be reserved by an eNodeB for the first scheduled transmission. In this case, apparatus 20 may be controlled by memory 34 and processor 32 to select one of the at least one partially overlapped time or frequency domain resources reserved by the eNodeB.

Figure 4A:
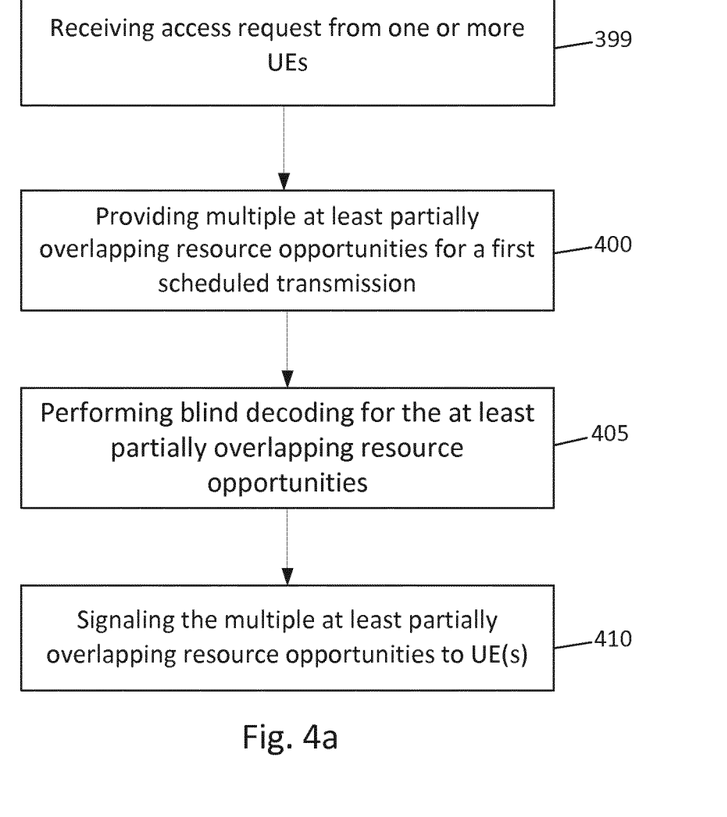
FIG. 4a illustrates a flow diagram of a method, according to one embodiment.

FIG. 4a illustrates an example of a flow diagram of a method, according to one embodiment of the invention. In one embodiment, the method depicted in FIG. 4a may be performed by an eNB. As illustrated in FIG. 4a, the method may include, at 399, receiving an access request, which may include a signature, from at least one user equipment. The method may also include, at 400, providing multiple at least partially overlapping resource opportunities for a first scheduled transmission. In an embodiment, the method may also include, at 405, performing blind decoding for the at least partially overlapping resource opportunities. In an embodiment, the first scheduled transmission is received with different assumptions for used partially overlapping resource opportunities. For example, if there are four different cyclic shifts available, eNB would receive message 3 using four different CSs. According to one embodiment, the multiple at least partially overlapping resource opportunities occupy the same resource space defined in frequency and time.

In some embodiments, the method may also include, at 410, signaling the multiple at least partially overlapping resource opportunities to one or more UEs.

In one embodiment, the providing of the resource opportunities may include reserving one or more DMRS for the first scheduled transmission. In another embodiment, the providing of the resource opportunities may include estimating time offset between UEs and then signaling the estimated time offset to the UE(s). In yet another embodiment, the providing of the resource opportunities may include reserving at least one partially overlapped time or frequency domain resources for the first scheduled transmission.

Figure 4B:
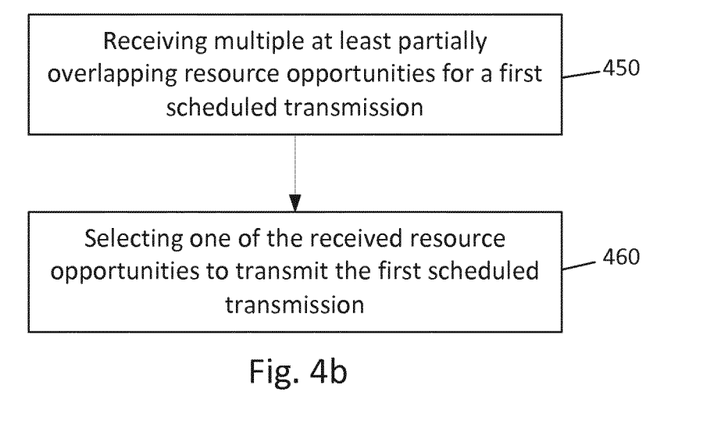
FIG. 4b illustrates a flow diagram of a method, according to another embodiment.

FIG. 4b illustrates an example of a flow diagram of a method, according to one embodiment of the invention. In one embodiment, the method depicted in FIG. 4b may be performed by a mobile device or UE. As illustrated in FIG. 4b, the method may include, at 450, receiving multiple at least partially overlapping resource opportunities for a first scheduled transmission. The method may then include, at 460, selecting one of the received resource opportunities to transmit the first scheduled transmission.

In some embodiments, the functionality of any of the methods described herein, such as those illustrated in FIGS. 4a and 4b discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

Figure 5A:
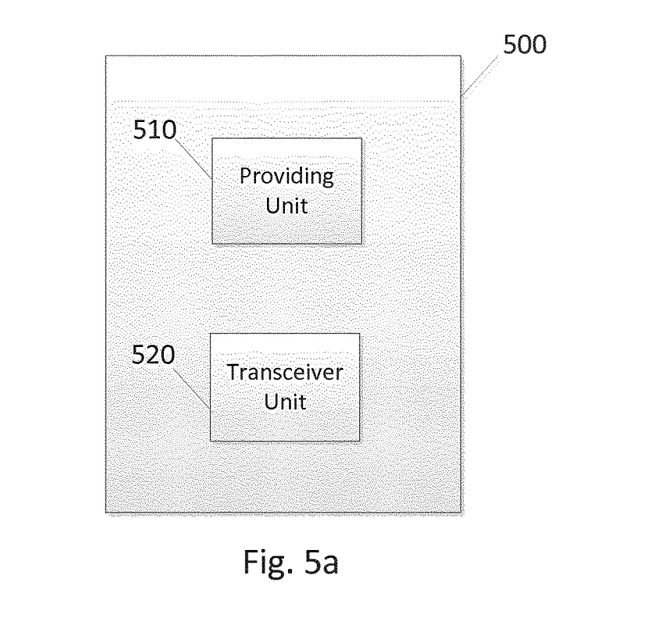
FIG. 5a illustrates a block diagram of an apparatus, according to one embodiment.

FIG. 5a illustrates a block diagram of an apparatus 500, according to one embodiment. In this embodiment, apparatus 500 may include a providing unit 510 and a transceiver unit 520. The transceiver unit 520 may be configured to receive an access request comprising a signature from at least one user equipment. The providing unit 510 may be configured to provide, for example to one or more UEs, multiple at least partially overlapping resource opportunities for a first scheduled transmission. In an embodiment, apparatus 500 may also be configured to perform blind decoding for the at least partially overlapping resource opportunities. The transceiver unit 520 may be configured to signal the multiple at least partially overlapping resource opportunities to the one or more UEs.

Figure 5B:
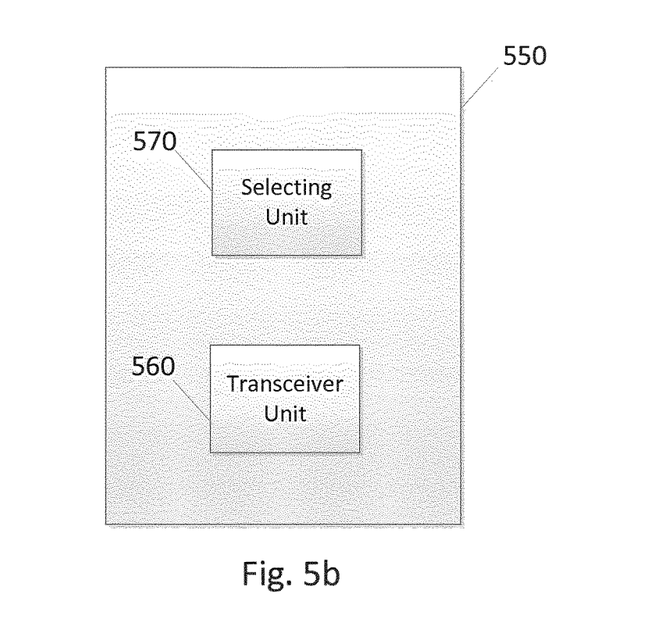
FIG. 5b illustrates a block diagram of an apparatus, according to another embodiment.

FIG. 5b illustrates a block diagram of an apparatus 550, according to one embodiment. In this embodiment, apparatus 550 may include a transceiver unit 560 and a selecting unit 570. The transceiver unit 560 may be configured to receive, for example from an eNB, multiple at least partially overlapping resource opportunities for a first scheduled transmission. The selecting unit 570 may be configured to select one of the received resource opportunities to transmit the first scheduled transmission.

In view of the above, embodiments of the invention may provide several advantages and/or benefits. For example, it is estimated that embodiments can provide three times higher RACH capacity compared to current LTE with the same number of RACH resources (based on simulation results with four receive antenna eNB). In certain embodiments, gain translated into 66.7% reduction in PRACH overhead with the same capacity. Additionally, the proposed solution can be seen as a way to reduce end user latency with given PRACH overhead. The source of the latency reduction includes a reduced amount of collision between RACH signatures. Also, as discussed above, legacy UEs can also benefit from the proposed scheme. Embodiments may be easily implemented as part of LTE evolution. Hence, it can be seen as a backwards compatible enhancement. Some embodiments may be especially beneficial for scenarios having considerable amount of machine type communications involved. Other advantages and benefits may also result from implementation of embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
   at least one processor; and
   at least one memory including computer program code,
   the at least one memory and computer program code configured, with the at least one processor, to cause the apparatus at least to:
   receive an access request comprising a signature from at least one user equipment;
   provide, to the at least one user equipment, multiple at least partially overlapping resource opportunities for a first scheduled transmission; and
   perform blind decoding of the first scheduled transmission for the multiple at least partially overlapping resource opportunities.

2. The apparatus according to claim 1, wherein the multiple at least partially overlapping resource opportunities occupy a same resource space defined in frequency and time.

3. The apparatus according to claim 1, wherein the at least one memory and computer program code are further configured, with the at least one processor, to cause the apparatus at least to provide the multiple at least partially overlapping resource opportunities in a random access response.

4. The apparatus according to claim 1, wherein the multiple at least partially overlapping resource opportunities comprise different demodulation reference signal sequences (DMRS) for the first scheduled transmission.

5. The apparatus according to claim 4, wherein the at least one memory and computer program code are further configured, with the at least one processor, to cause the apparatus at least to calculate channel estimate for each of the at least one demodulation reference signal sequences (DMRS) and employ interference rejection combining (IRC) between antennas.

6. The apparatus according to claim 1, wherein the at least one memory and computer program code are further configured, with the at least one processor, to cause the apparatus at least to reserve at least one partially overlapped time or frequency domain resources for the first scheduled transmission.

7. A method, comprising:
   transmitting, by a user equipment, an access request comprising a signature;
   receiving a response;
   receiving, by the user equipment, at least partial configuration of multiple at least partially overlapping resource opportunities for the first scheduled transmission from an evolved node B (eNodeB); and
   selecting, by the user equipment, one of the multiple at least partially overlapping resource opportunities to transmit a first scheduled transmission.

8. The method according to claim 7, wherein the receiving comprises receiving at least partial configuration for the multiple at least partially overlapping resource opportunities in a random access response.

9. The method according to claim 7, wherein the selecting comprises selecting one of the multiple at least partially overlapping resource opportunities in random or pseudo-random manner.

10. The method according to claim 7, wherein at least partially overlapping resources comprise different demodulation reference signal sequences (DMRS) for the first scheduled transmission.

11. The method according to claim 7, wherein the receiving comprises receiving estimated time offset from an eNodeB, and wherein the selecting comprises selecting a time offset for the first scheduled transmission based on the estimated time offset received from the eNodeB.

12. An apparatus, comprising:
   at least one processor; and
   at least one memory including computer program code,
   the at least one memory and computer program code configured, with the at least one processor, to cause the apparatus at least to:
   transmit an access request comprising a signature;
   receive a response;
   receive multiple at least partially overlapping resource opportunities for a first scheduled transmission; and
   select one of the multiple at least partially overlapping resource opportunities to transmit a first scheduled transmission.

13. The apparatus according to claim 12, wherein the at least one memory and computer program code are further configured, with the at least one processor, to cause the apparatus at least to receive the multiple at least partially overlapping resource opportunities in a random access response.

14. The apparatus according to claim 12, wherein at least one demodulation reference signal sequences (DMRS) are reserved for the first scheduled transmission.

15. The apparatus according to claim 14, wherein the at least one memory and computer program code are further configured, with the at least one processor, to cause the apparatus at least to select one out of the at least one demodulation reference signal sequences (DMRS) for the first scheduled transmission.

16. The apparatus according to claim 14, wherein the at least one demodulation reference signal sequences (DMRS) comprises at least one cyclic shift of a same base sequence.

17. The apparatus according to claim 12, wherein the at least one memory and computer program code are further configured, with the at least one processor, to cause the apparatus at least to receive estimated time offset from an eNodeB, and to select a time offset for the first scheduled transmission based on the estimated time offset received from the eNodeB.

18. The apparatus according to claim 17, wherein the time offset is made cyclically in symbol level inside single carrier frequency division multiple access (SC-FDMA) symbol or is set on sample level prior discrete Fourier transform (DFT).

\* \* \* \* \*